(12) United States Patent
Nishikawa

(10) Patent No.: US 8,073,255 B2
(45) Date of Patent: Dec. 6, 2011

(54) KEYWORD GENERATION PROCESS

(75) Inventor: Eiichi Nishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1017 days.

(21) Appl. No.: 11/952,903

(22) Filed: Dec. 7, 2007

(65) Prior Publication Data

US 2008/0144936 A1  Jun. 19, 2008

(30) Foreign Application Priority Data

Dec. 13, 2006  (JP) ................. 2006-336380

(51) Int. Cl.
    *G06K 9/20*    (2006.01)
    *G06K 9/46*    (2006.01)
    *G06K 9/00*    (2006.01)

(52) U.S. Cl. ........................ 382/177; 382/190

(58) Field of Classification Search .......... 382/164, 382/168, 173, 177, 190, 224, 225, 305; 705/14; 707/100–102, 767; 709/203, 238; 715/205, 715/513, 523
See application file for complete search history.

(56) References Cited

U.S. PATENT DOCUMENTS

| | | | | |
|---|---|---|---|---|
| 7,069,503 B2* | 6/2006 | Tanimoto | | 715/202 |
| 7,191,212 B2* | 3/2007 | Hirai | | 709/203 |
| 7,382,933 B2* | 6/2008 | Dorai et al. | | 382/276 |
| 7,487,161 B2* | 2/2009 | Steuernagel et al. | | 1/1 |
| 7,831,610 B2* | 11/2010 | Takata et al. | | 707/767 |
| 7,853,866 B2* | 12/2010 | Tanaka | | 715/205 |
| 2003/0055819 A1* | 3/2003 | Saito et al. | | 707/3 |
| 2007/0130188 A1* | 6/2007 | Moon et al. | | 707/101 |
| 2007/0136327 A1* | 6/2007 | Kim et al. | | 707/100 |
| 2008/0004947 A1* | 1/2008 | Mathew et al. | | 705/14 |
| 2008/0144936 A1* | 6/2008 | Nishikawa | | 382/177 |

FOREIGN PATENT DOCUMENTS

| | | |
|---|---|---|
| JP | 2003-016070 A | 1/2003 |
| JP | 2004-318187 A | 11/2004 |
| JP | 2006-155380 A | 6/2006 |

OTHER PUBLICATIONS

Satou, Tetsuji, "The Forefront of Database," May 5, 2000, vol. 32 No. 5 pp. 76-113.

* cited by examiner

*Primary Examiner* — Amir Alavi

(57) ABSTRACT

An apparatus includes a content acquisition unit configured to acquire content data contained in image data, an extraction unit configured to extract a keyword from the image data, a setting unit configured to set acceptance or rejection of modification of the keyword according to a keyword extracted by the extraction unit, and a storage unit configured to store the data of the content, the keyword, and the setting of acceptance or rejection of modification in association with each other.

12 Claims, 13 Drawing Sheets

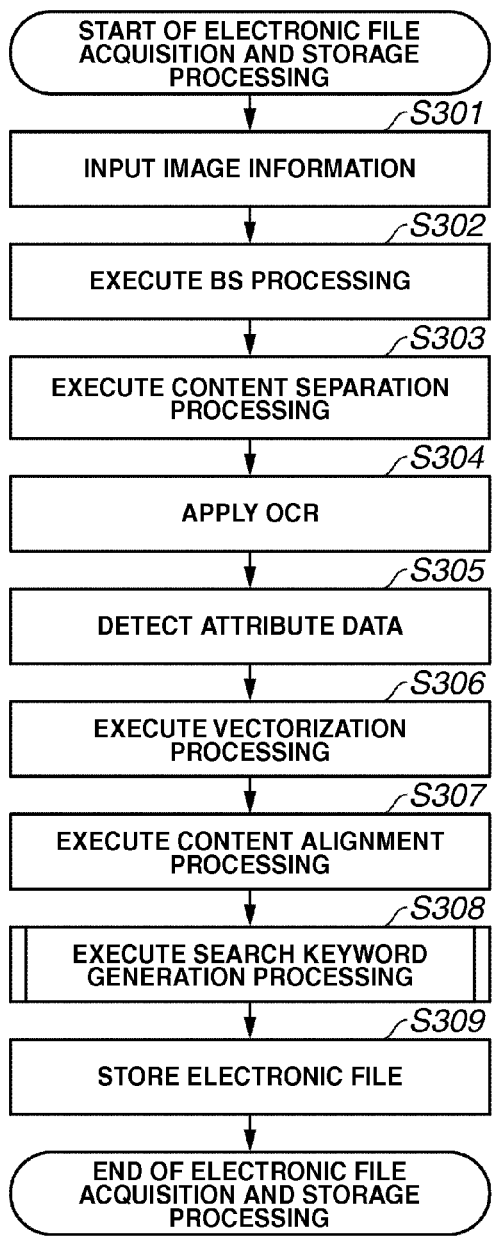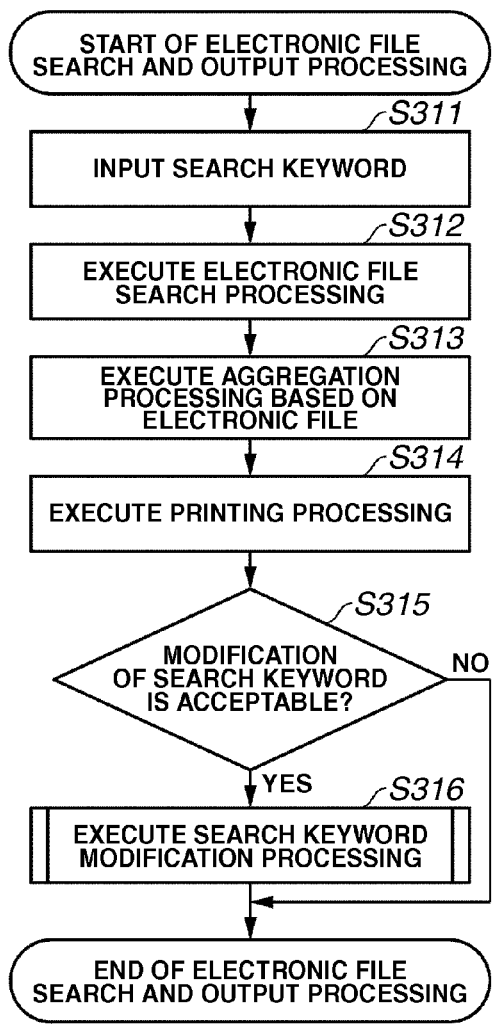

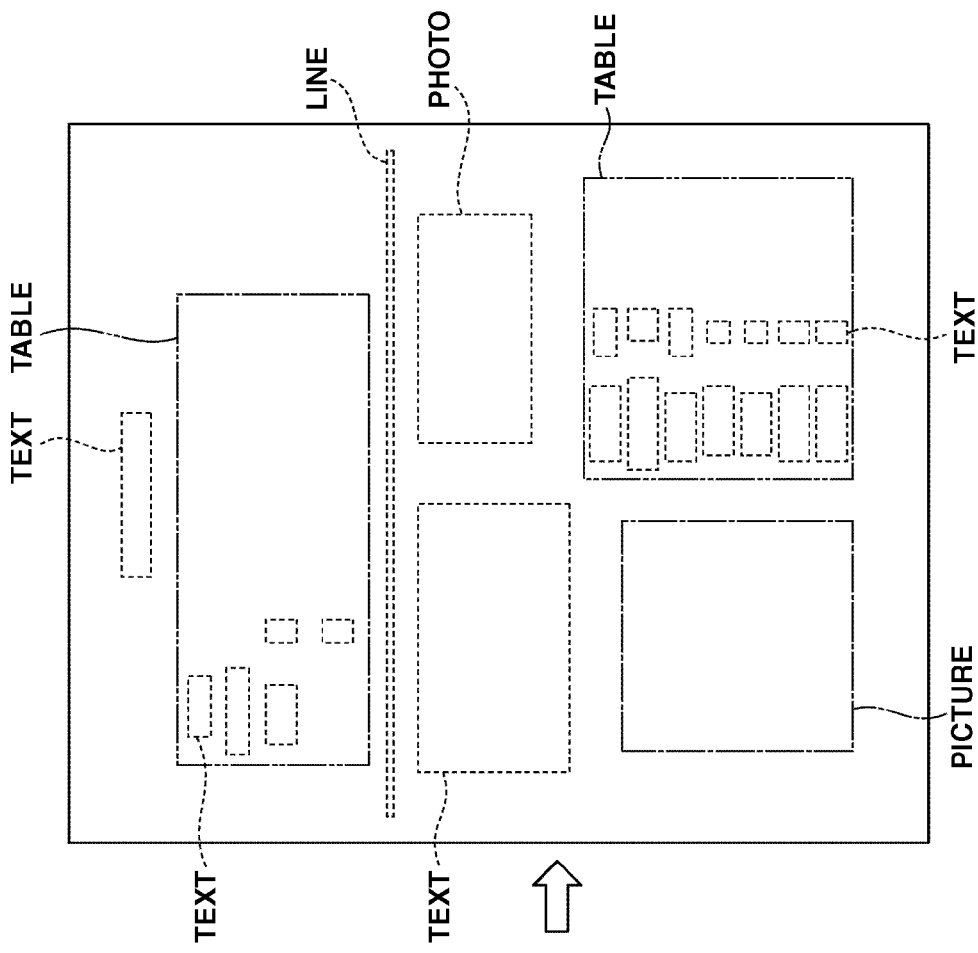
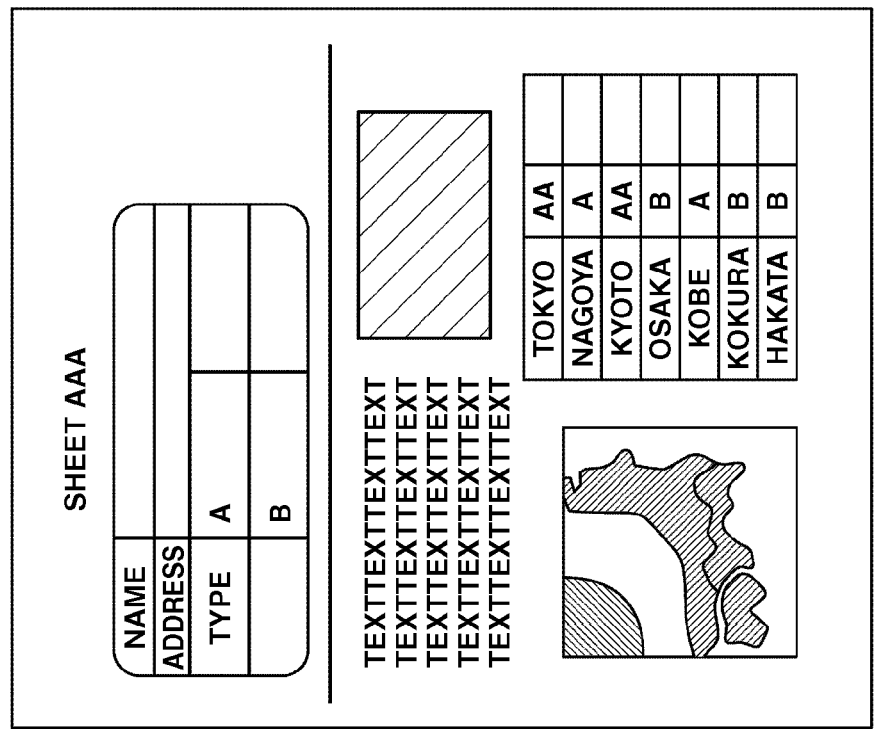

FIG.5

BLOCK INFORMATION

| | ATTRIBUTE | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | YES |
| BLOCK 2 | 3 | X2 | Y2 | W2 | H2 | YES |
| BLOCK 3 | 2 | X3 | Y3 | W3 | H3 | NO |
| BLOCK 4 | 1 | X4 | Y4 | W4 | H4 | YES |
| BLOCK 5 | 3 | X5 | Y5 | W5 | H5 | YES |
| BLOCK 6 | 5 | X6 | Y6 | W6 | H6 | NO |

ATTRIBUTE 1: TEXT 2: PICTURE 3: TABLE 4: LINE 5: PHOTO

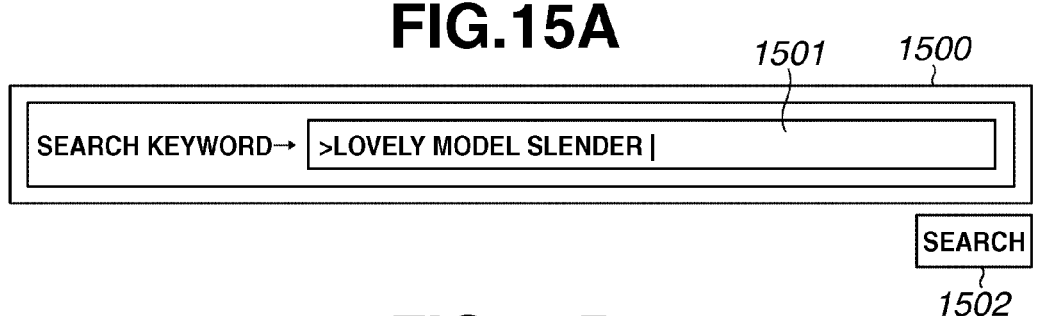
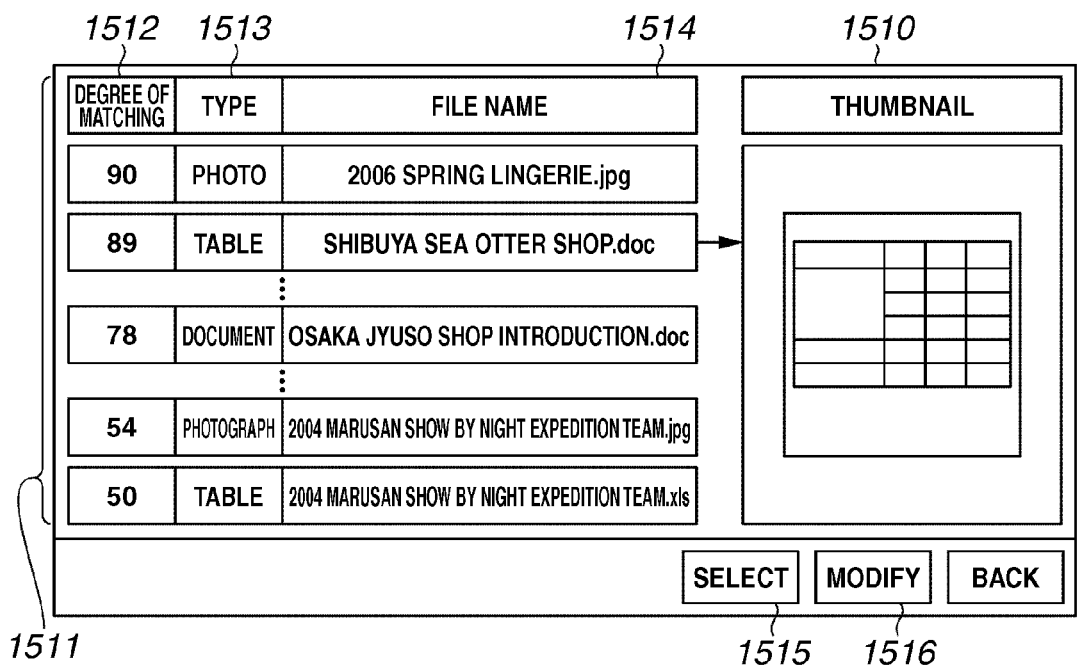
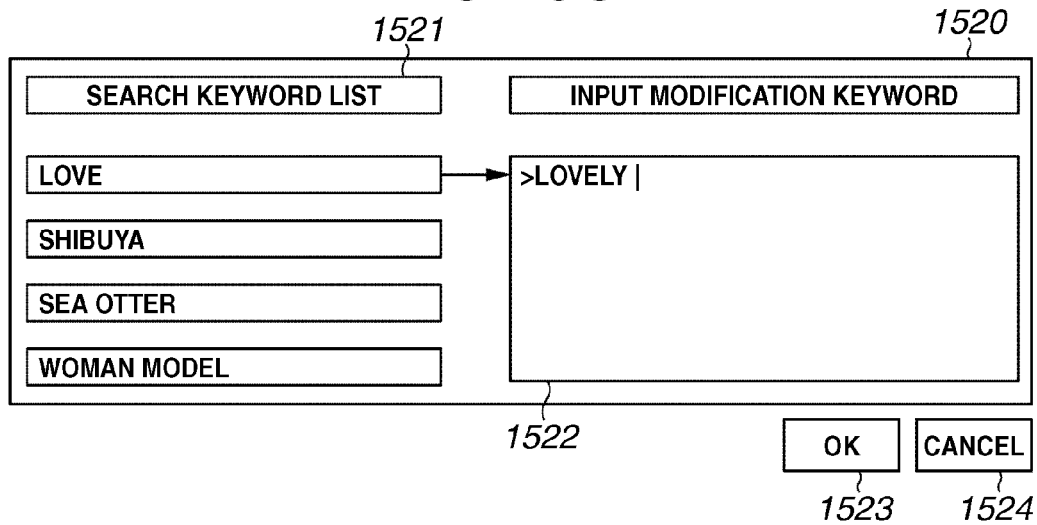

KEYWORD GENERATION PROCESS

BACKGROUND OF THE INVENTION

1. Field of the Invention

The present invention relates to an image processing apparatus (e.g., multifunction peripheral) capable of processing and storing content data extracted from an input image to enable a search of the content data based on a search keyword, and its control method.

2. Description of the Related Art

Various image processing systems exist that allow users to obtain desirable print output by storing image data (content) in a storage device such as a file server, searching for the image data using a search keyword as required, and printing the image data by a printer or the like as discussed in Japanese Patent Application Laid-Open No. 2004-318187. In such a system, as the volume of image data to be stored increases, a method for selecting an appropriate keyword to be associated with image data may be important for facilitating users to subsequently find and retrieve desired image data.

On the other hand, it may also be desired that a document image is scanned for reuse of a part of the contents in the document. However, since each document can include a large volume of contents, it may be inconvenient for a user if the user needs to manually input a suitable search keyword for each content. Accordingly, in such a system, it is desirable that an apparatus is configured to automatically apply a search keyword to the content.

In other words, when a user generates and stores data for each content, it is desirable that an apparatus is configured to store the data in a storage device after a suitable keyword has been automatically added to the data.

However, in a circumstance where a machine itself does not understand contents, a quality of keywords that are automatically added by the machine may not be at a satisfactory level.

Therefore, in order to enhance the search accuracy of data in such a system, it is desirable that the system is configured so as to easily perform editing such as modification, addition, or deletion of a keyword that is associated with stored data.

However, if the edit of a search keyword is unlimitedly permitted, attribute data (information about restriction in processing of image data) such as the permission of copying and the distribution restriction of data can also be changed. As a result, there is a problem that security information associated with stored data may not be maintained.

SUMMARY OF THE INVENTION

An embodiment of the present invention is directed to an image processing apparatus for enhancing search accuracy and maintaining information security at the same time in the image processing apparatus which extracts the content in documents and stores it so as to allow a search by a search keyword.

According to an aspect of the present invention, an apparatus includes a content acquisition unit configured to acquire content data contained in image data, an extraction unit configured to extract a keyword from the image data, a setting unit configured to set acceptance or rejection of modification of the keyword according to a keyword extracted by the extraction unit, a storage unit configured to store the content data, the keyword, and the setting of acceptance or rejection of modification in association with each other.

According to another aspect of the present invention, an image processing apparatus can enhance search accuracy and maintain information security at the same time in the image processing apparatus which stores content in a document to allow a user to conduct a search by a search keyword.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B are flowcharts illustrating processing flows executed in a multifunction peripheral (MFP) according to an exemplary embodiment of the present invention.

FIGS. 4A and 4B are diagrams illustrating block selection processing according to an exemplary embodiment of the present invention.

FIG. 5 is a diagram illustrating one example of block information acquired by block selection processing according to an exemplary embodiment of the present invention.

FIGS. 15A to 15C are diagrams illustrating a user interface for electronic file search and output processing in a MFP according to an exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
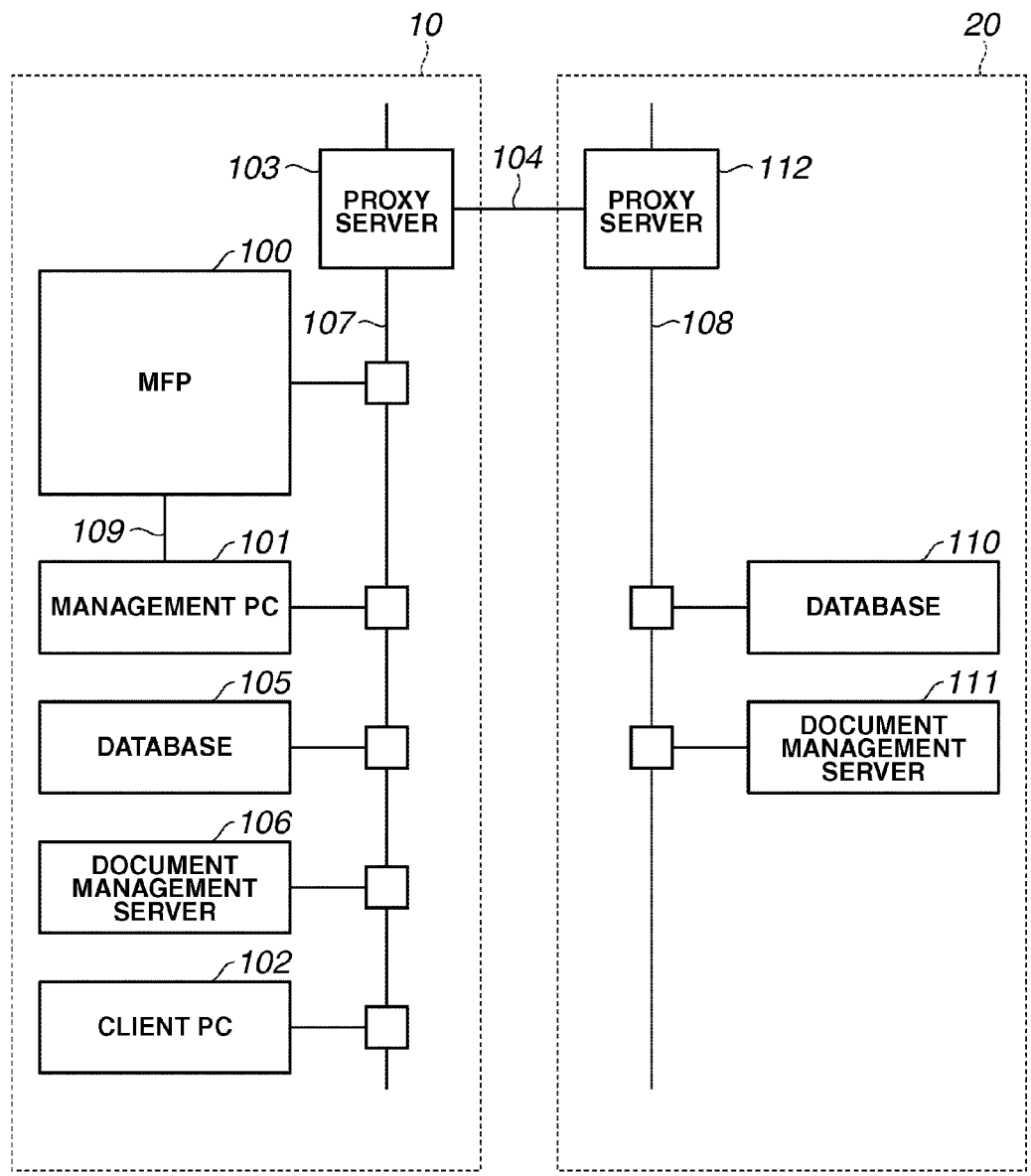
FIG. 1 is a diagram illustrating an image processing system including a multifunction peripheral (MFP) according to an exemplary embodiment of the present invention.

FIG. 1 is a diagram illustrating a configuration of an image processing system including a MFP 100 according to an exemplary embodiment of the present invention. In the present exemplary embodiment, the MFP 100 is connected in an environment where an office 10 and an office 20 are connected with each other through the Internet 104.

A local area network (LAN) 107 constructed in the office 10 is connected with the MFP 100 and a management personal computer (PC) 101 which controls the MFP 100, a client PC 102, a document management server 106, a database 105, and a proxy server 103. The local area network (LAN) 107 and a LAN 108 in the office 20 are connected by the Internet 104 through the proxy servers 103 and 112. Further, the LAN 108 is connected with a document management server 111 and a database 110.

In the present exemplary embodiment, the MFP 100 performs image reading processing of documents and image processing of a signal of a read image. The management PC 101 is a general personal computer (PC). The management PC 101 includes an image storage unit, an image processing unit, a display unit, and an input unit. In an embodiment, a part of the management PC is integrated with the MFP 100. Alternatively, all the functions of the management PC 101 can be incorporated into the MFP 100.

Figure 2:
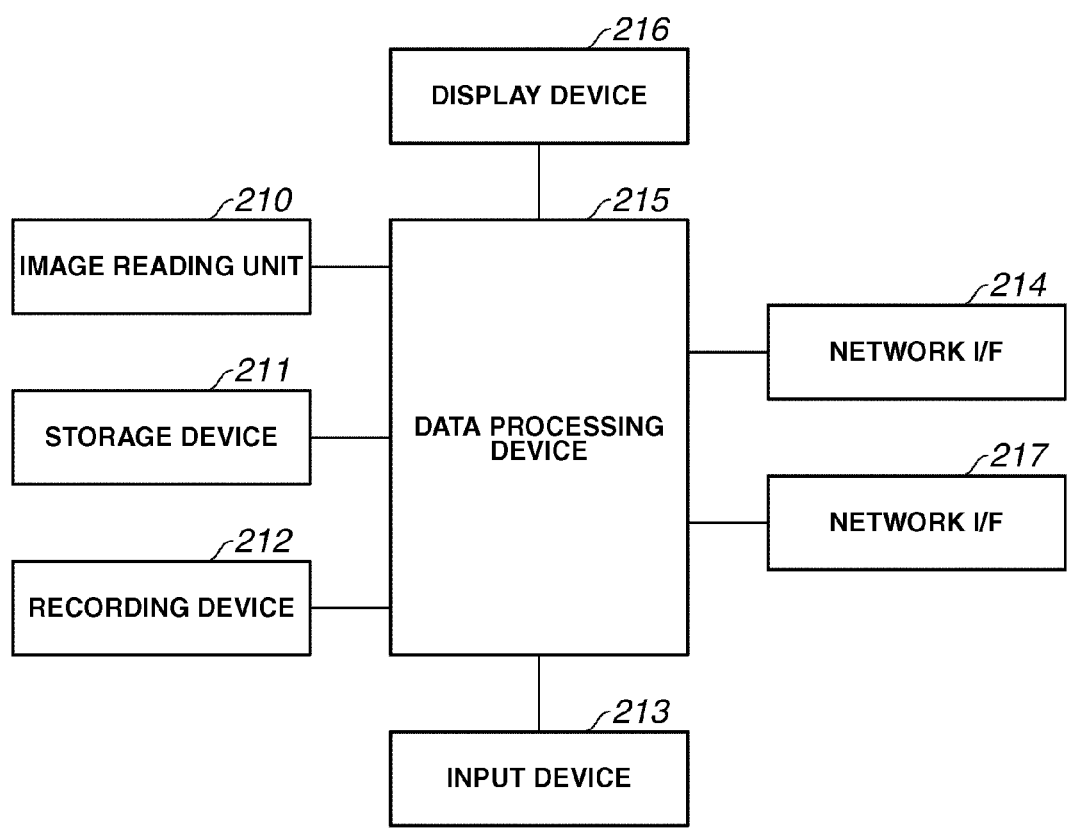
FIG. 2 is a diagram illustrating a configuration of a multifunction peripheral (MFP) according to an exemplary embodiment of the present invention.

FIG. 2 is a diagram illustrating a configuration of the MFP 100. In FIG. 2, an image reading unit 210 includes an auto document feeder (hereinafter, referred to as ADF). The image reading unit 210 irradiates a bundle of documents or one document with a light source (not illustrated). The image reading unit 210 forms an image reflected from the document on a solid image sensor with a lens system. The image reading unit 210 obtains a signal of a raster-like read image from the solid image sensor as image information (bit map image) having a density of 600 dots per inch (dpi). In a general copying function, a data processing device 215 converts the bit map image into image data suitable for printing in a recording device 212. When a plurality of documents are copied, each page of the image data is temporarily stored in a storage device 211, then is output to a recording device 212 to be printed on a sheet one by one.

On the other hand, print data to be output from the client PC 102 or the like are transmitted from the LAN 107 via a network interface (I/F) 214 to the data processing device 215. In the data processing device 215, the print data is converted into printable image data. Then, in a recording device 212, the printable image data is printed on a sheet.

A user inputs an instruction into the MFP 100 through an input device 213 such as a key operation unit equipped on the MFP 100, and an input device such as a key board and a mouse connected to the management PC 101. Series of these operations are controlled by a control unit (not illustrated) in the data processing device 215.

The data processing device 215 includes a central processing unit (CPU), a read only memory (ROM), a random access memory (RAM), and a control program and data according to the present exemplary embodiment.

A display device 216 displays an operation input state and image data being processed. The storage device 211 can be controlled also by the management PC 101. The transmission and receiving of data, and the control between the MFP 100 and the management PC 101 are executed via the network I/F 217 and a directly connected LAN 109 (FIG. 1).

Next, the outline of the entire processing to be executed in the multifunction peripheral (MFP) 100 will be described with reference to FIGS. 3A and 3B.

FIG. 3A is a diagram illustrating a flow of the electronic file acquisition and storage processing in the MFP 100. FIG. 3B is a diagram illustrating a flow of the electronic file search and output processing in the MFP 100.

In FIG. 3A, in step S301, the MFP 100 executes image information input processing. More specifically, the MFP 100 operates the image reading unit 210 of the MFP 100 and raster-scans each document. Thus, the MFP 100 obtains a bit map image of 600 dpi-8 bits. Then, the data processing device 215 preprocesses the bit map image, and the storage device 211 stores the preprocessed bit map image as image data page-by-page.

In step S302, the MFP 100 executes block selection processing (region segmentation processing). More specifically, the MFP 100 first separates the image data stored in step S301 page-by-page according to a region such as a character/line drawing part and a halftone image part. The MFP 100 further separates the character/line drawing part according to each character block which is held together as a cluster in a paragraph, or according to each graphic block of a line and a table, to convert each part into an object. On the other hand, the MFP 100 segments the halftone image part such as a photo and a picture into an independent object for each photo block and picture block that is segmented into a rectangle form. Further, the MFP 100 compiles information about each block converted into the object, on a list to generate block information. Segmentation into a region (block) according to each attribute as described above is referred to as block selection processing.

In step S303, the MFP 100 executes content separation processing in which each object segmented in step S302 is dealt with as the content. In step S304, the MFP 100 applies an optical character reader (OCR) to a character part in each content to acquire text data.

Further, in step S305, if data are recorded in the document using an electronic watermark (a digital watermark), a two-dimensional barcode or the like, the MFP 100 detects the data as attribute data belonging to the page. A method of embedding these attribute data is not limited. For example, it is possible to record the attribute data using an invisible electronic watermark, or a visible two-dimensional barcode or watermark. As an example of the invisible electronic watermark, any suitable method of embedding information can be used. In an implementation, information is embedded by infinitesimally changing a gap between characters or striking a yellow dot on a halftone image part.

In step S306, the MFP 100 executes conversion processing from image data to vector data (vectorization processing). First, the MFP 100 recognizes the size, the style and the font of characters of the text data obtained by applying the OCR in step S304. The MFP 100 converts the characters obtained by raster-scanning of a document into visibly faithful font data. On the other hand, the MFP 100 converts a graphic block of a line and a table into outline fonts (i.e., vector data). Further, the MFP 100 processes a photo and a picture blocks as an individual joint photographic experts group (JPEG) file.

In step S307, the MFP 100 executes content alignment processing. More specifically, the MFP 100 binds contents across preceding and subsequent pages for each object which is separated by the block selection processing in step S302 to group the contents to become meaningful (semantic) contents. For example, in the case of the character region of a text document, there is a case where a line is changed to a next paragraph or a next page in the middle of the text. In such a case, the MFP 100 determines whether the character regions should be bound as one text. This is performed by a morphologic analysis and a syntax analysis for analyzing whether the character region has a meaningful connection.

In step S308, the MFP 100 generates a search keyword using block information generated in step S302, text data acquired in step S304, and attribute data detected in step S305.

In step S309, the MFP 100 stores vector data subjected to content alignment processing in the storage device 211, as an electronic file. At this time, the MFP 100 stores the search keyword generated in step S308 as a part of the electronic file in association with vector data (for example, a search keyword is converted into a format such as a rich text format (rtf), a portable document format (PDF), and an extensible markup language (XML), and is stored in the storage device 211 as an electronic file).

As described above, image data vectorized for each content can be searched as an electronic file using the search keyword which is stored in association with vector data in step S309.

Next, electronic file search and output processing in FIG. 3B will be described. When a search keyword is input in step S311, the MFP 100 searches an electronic file stored in the storage device 211 based on the search keyword in step S312.

In step S313, a user performs desired aggregation processing based on the searched electronic file. In step S314, the MFP 100 prints and outputs the electronic file after the aggregation processing is finished.

After the print processing is completed in step S314, in step S315, the MFP 100 determines whether the modification of the search keyword is required based on a user command.

If it is determined that modification of the search keyword is required (YES in step S315), the processing proceeds to step S316. The MFP 100 executes search keyword modification processing. On the other hand, if it is determined that the modification of the search keyword is not required (NO in step S315), the processing ends.

As described above, since the MFP 100 includes the modification function of a search keyword and a user can modify a search keyword, enhancement of search accuracy can be expected.

Each step of the above-described electronic file acquisition and storage processing will be described in detail below.

First, the block selection processing illustrated in step S302 will be described in detail.

In the block selection processing, the MFP 100 recognizes image data (for example, refer to FIG. 4A) for each page acquired in step S301 of FIG. 3A as a cluster for each block. Then, the MFP 100 segments the blocks into a block of each region attribute, such as a text, a picture, a photo, a line, and a table (refer to FIG. 4B).

A specific example of the block selection processing will be described below. First, the MFP 100 binarizes image data to white and black. The MFP 100 traces a contour line to extract the cluster of a picture element surrounded by a black picture element contour. For the cluster of a black picture element having a large area, the MFP 100 traces also a contour line of a white picture element which exists inside the black picture. The MFP 100 extracts the cluster of the white picture element. Further, the MFP 100 recursively extracts the cluster of the black picture element from inside the cluster of the white picture element having an area not less than a predetermined area.

The MFP 100 classifies the cluster of the black picture element obtained in such a manner according to a size and a shape, and assigns them into a region having a different block. For example, the MFP 100 classifies the cluster whose aspect ratio is close to 1 and whose size is in a predetermined range, into a picture element cluster corresponding to characters. Further, the MFP 100 classifies a portion in which adjacent characters can be grouped in a good alignment state, into a character block and classifies a flat picture element cluster into a line block. Further, the MFP 100 classifies an area held by a black picture element cluster containing a white picture element cluster of a box shape that has a size not less than a predetermined size in a good alignment state, into a table block. Furthermore, the MFP 100 classifies a block in which a picture element cluster having an infinite shape is scattered, into a photo block, and classifies a picture element cluster having other optional shapes into a picture block.

One example of block information about each block obtained by the block selection processing is illustrated in FIG. 5. The block information about each block is used as a search keyword. The OCR information is acquired in step S304.

Next, attribute data detection processing illustrated in step S305 will be described in detail.

Figure 6:
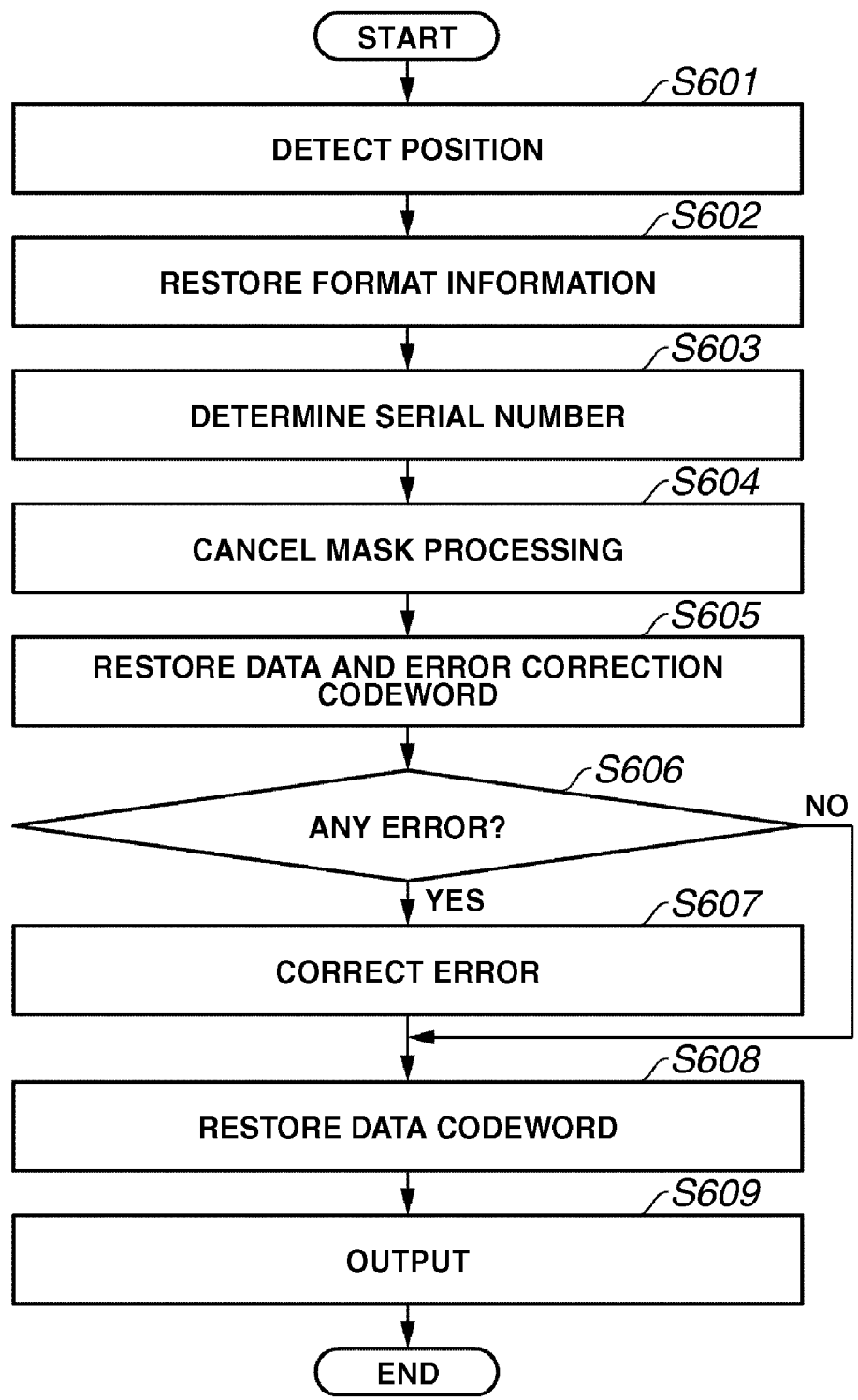
FIG. 6 is a flowchart illustrating flow which decodes a two-dimensional barcode added to image data to output a data character string according to an exemplary embodiment of the present invention.
Figure 7:
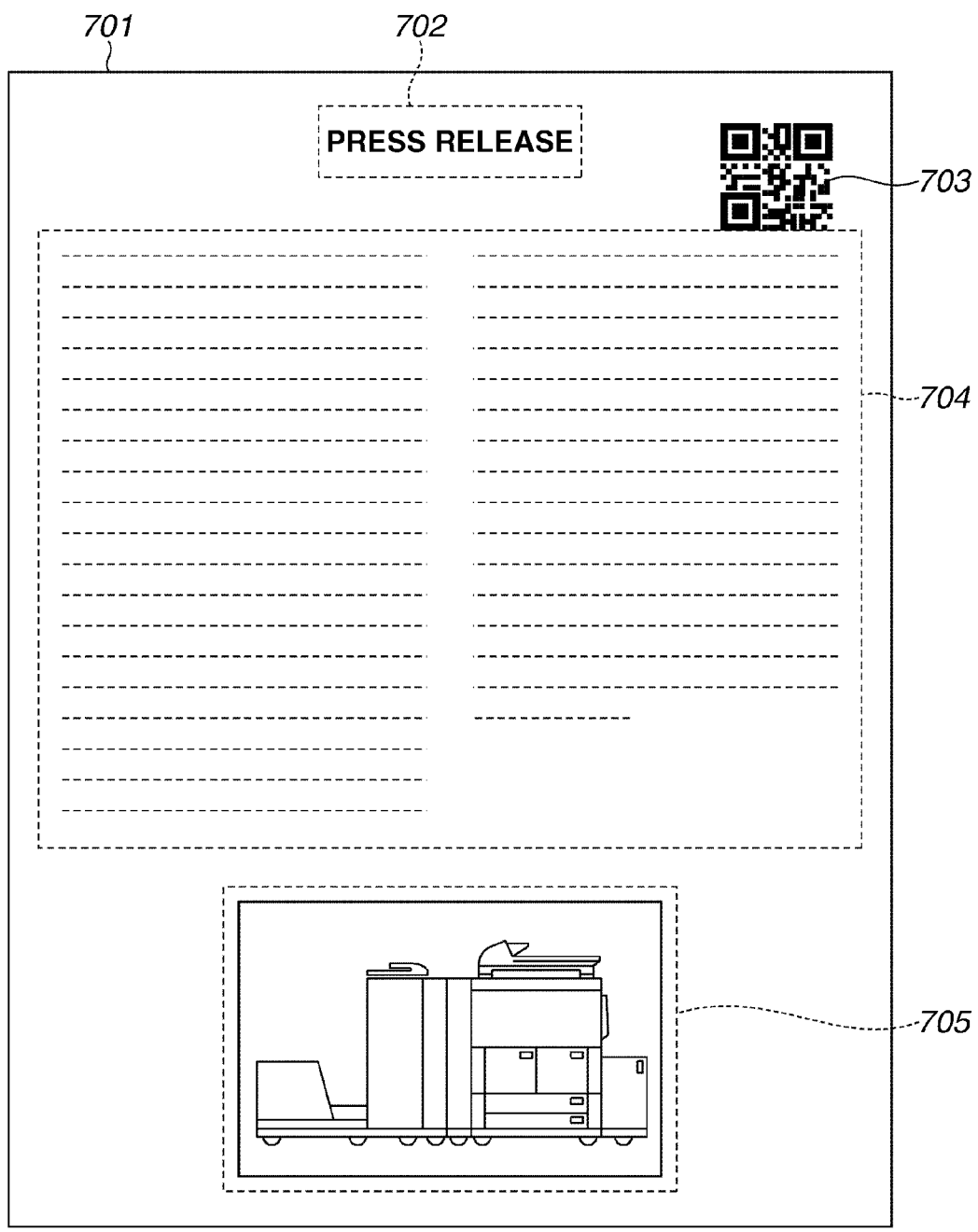
FIG. 7 is a diagram illustrating one example of documents to which a two-dimensional barcode is added, according to an exemplary embodiment of the present invention.

FIG. 6 is a flowchart illustrating a process of decoding a two-dimensional barcode (e.g., quick response (QR)code) contained in image data to output a data character string as attribute data (information concerning processing restriction). FIG. 7 is a diagram illustrating one example of a document to which a two-dimensional barcode is added.

In attribute data detection processing, concerning image data stored in the storage device 211, the MFP 100 first detects the predetermined position of a QR code 703 from the result of the above-described block selection processing (step S601). The position detection pattern of the QR code includes the same position detection element pattern which is placed on three corners among four corners of the QR code.

Next, the MFP 100 decodes formal information adjacent to a position detection pattern, and obtains an error correction level and a mask pattern applied to the QR code in step S602.

Subsequently, in step S603, the MFP 100 determines the serial number of the quick response (QR) code. Then, the MFP 100 cancels mask processing by performing exclusive logical addition (XOR) operation on a coding region bit pattern using a mask pattern obtained as the formal information in step S604.

In step S605, the MFP 100 reads a symbol character according to a mapping rule corresponding to a model to restore data of a message and an error correction codeword.

In step S606, the MFP 100 detects whether an error exits on the restored code. If an error is detected (YES in step S606), the processing proceeds to step S607 and the MFP 100 corrects the error.

In step S608, the MFP 100 divides a data codeword into segments based on the mode designator and the character number designator of data whose error was corrected.

Finally, the MFP 100 decodes a data character string based on a specification mode and outputs the result in step S609.

The data character string embedded in the QR code represents the attribute data of the page and includes, for example, information about processing restriction such as acceptance or rejection of copying, and distribution restriction.

For the sake of explanation, a document 701 provided with attribute data by the QR code is described as one example. However, the present invention is not particularly limited to this example. For example, if the attribute data is directly recorded in a character string, the attribute data can be obtained by detecting the block of the character string complying with a designated rule by the above-described block selection processing, and executing character recognition of each character in the character string which indicates the attribute data.

Further, the attribute data can also be provided by adding modulation to a gap between adjacent characters of the character block 702 of the document 701 in FIG. 7 or a character string 704 to an extent hardly visible to eyes, and by embedding information utilizing a variation in the gap between characters. Such invisible watermark information can be obtained as attribute data by detecting the gap of each character to decode the embedded information when character recognition processing is executed, which will be described later. Furthermore, it is possible to add attribute data to a picture 705 as an invisible electronic watermark.

Next, vectorization processing illustrated in step S306 in FIG. 3A will be described in detail. First, the MFP 100 performs character recognition processing of each character on text data obtained by applying the OCR.

In character recognition, the MFP 100 executes recognition of image data clipped as a character using one of pattern matching methods to obtain a corresponding character code. In this character recognition processing, an observation feature vector and a dictionary feature vector are compared, and a character code of a most closest character type is output as a result of recognition. The observation feature vector can be obtained by converting a feature extracted from the clipped image data, into a numeric string having several tens of dimensions. The dictionary feature vector is given beforehand for each character type. As to the extraction of the feature vector, various suitable methods may be employed. For example, a character can be segmented into a mesh shape and a character line can be counted in a mesh as a line element according to each direction of the character line.

When the MFP 100 performs character recognition on the character block extracted by the block selection processing (step S302), first, the MFP 100 determines whether the corresponding block is horizontally written or vertically written. The MFP 100 clips a line in a corresponding direction and then clips a character to obtain character image data. In the horizontal writing and the vertical writing, a horizontal/vertical projection is made with respect to a picture element value within the corresponding block. If the dispersion of the horizontal projection is larger, it is determined as a horizontal writing block. If the dispersion of the vertical projection is larger, it is determined as a vertical writing block. If the character block is horizontally written, breakdown into a character string and a character is performed by clipping a line utilizing a projection in a horizontal direction and then a character is clipped from a projection in a vertical direction with respect to the clipped horizontal line. As to the character block in vertical writing, the horizontal and the vertical is reversed. At this stage, the size of a character can be detected.

The MFP 100 can recognize the font information about a character by preparing a plurality of dictionary feature vectors for character type numbers which are used when character recognition is executed with respect to a character shape type, that is, a font type. The font information about a character can be recognized by outputting the font type together with a character code when matching is performed.

The MFP 100 converts text data into vector data in combination with outline font data prepared beforehand, using character code and font information obtained by the character recognition processing and font recognition processing. If a document is color, the MFP 100 extracts the color of each character from a color image and record the character color together with vector data.

By the above-described processing, the MFP 100 can convert image data corresponding to text data into vector data which closely represent the text data in shape, size, and color.

Figure 8:
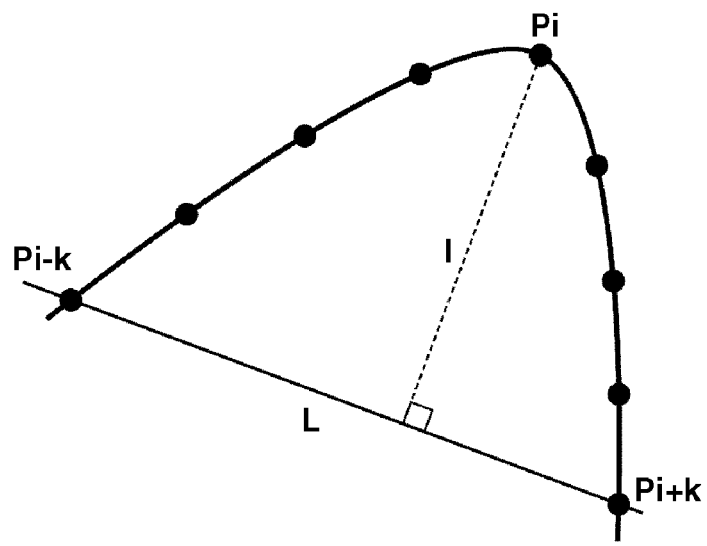
FIG. 8 is a diagram illustrating vectorization processing of a block other than characters according to an exemplary embodiment of the present invention.

In the block selection processing (step S302), as to a block classified as a line and a table block, the MFP 100 converts the contour of a picture element cluster having a significant color extracted from the block, into vector data. More specifically, the MFP 100 partitions the point string of a picture element which forms a contour, at a point that is regarded as a corner, to approximate each segment by a partial straight line or a curve. The corner is a point where a curvature is maximum. As illustrated in FIG. 8, the corner is a point where a distance between a chord and an arbitrary point Pi is maximum when the chord is drawn between a point Pi−k and a point Pi+k that is laterally k points apart from the arbitrary point Pi. Further, when a chord length/an arc length between the point Pi−k and the point Pi+k is a length R, a point where the value of the length R is not more than a threshold can be regarded as a corner. After each segment is partitioned by a corner, a straight line can be vectorized using a least-square method about a point string. A curve can be vectorized using a cubic spline function.

Further, when a target has an inner contour, the target is similarly approximated by a partial straight line or curve using the point string of a white picture element contour extracted in the block selection processing.

As described above, the outline of graphics having an arbitrary shape can be vectorized using the piecewise line approximation of a contour. If a document is color, the color of graphics is extracted from a color image and can be recorded together with vector data.

Figure 9:
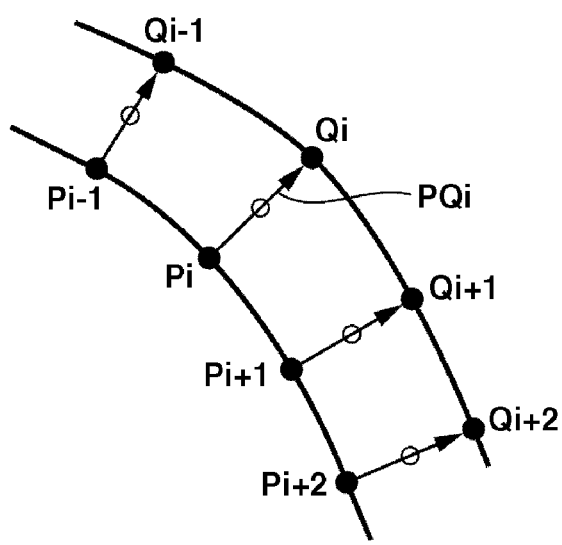
FIG. 9 is a diagram illustrating vectorization processing of a block other than characters according to an exemplary embodiment of the present invention.

Further, as illustrated in FIG. 9, in a certain segment, when an outer contour is adjacent to an inner contour or another outer contour, two contour lines can be put together to be a line having some thickness. More specifically, a line is drawn from each point Pi of one contour to a point Qi on another contour that is at a shortest distance from the Pi. If each distance PQi is on average not more than a fixed length, the middle point of the distance PQi is treated as a point string and a target segment is approximated by a straight line or a curve. Its thickness is an average of the distance PQi. A table of ruled line, which is a line or an aggregate of lines, can be efficiently presented by a vector as the aggregate of lines having a thickness as described above.

In the above-described vectorization in which character recognition processing is performed on a character block, as a result of the character recognition processing, a character whose distance to a dictionary is closest is used. However, if this distance is not less than a predetermined value, the character is not necessarily consistent with a right character. Thus, the character can be often misidentified as a character having a similar shape. Accordingly, in the present exemplary embodiment, as described above, such a character is processed similar to a general line drawing and is subjected to outline operation based on the contour of the character image. As a result, the character which was conventionally misidentified by the character recognition processing, is not vectorized into a wrong character and can be vectorized by performing the outline operation on the character to generate faithfully visible image data.

In the present exemplary embodiment, a block determined to be a picture or a photo cannot be vectorized, therefore, such a block is compressed by a JPEG or the like as image data.

Subsequently, content alignment processing illustrated in step S307 in FIG. 3A will be described in detail.

Figure 10:
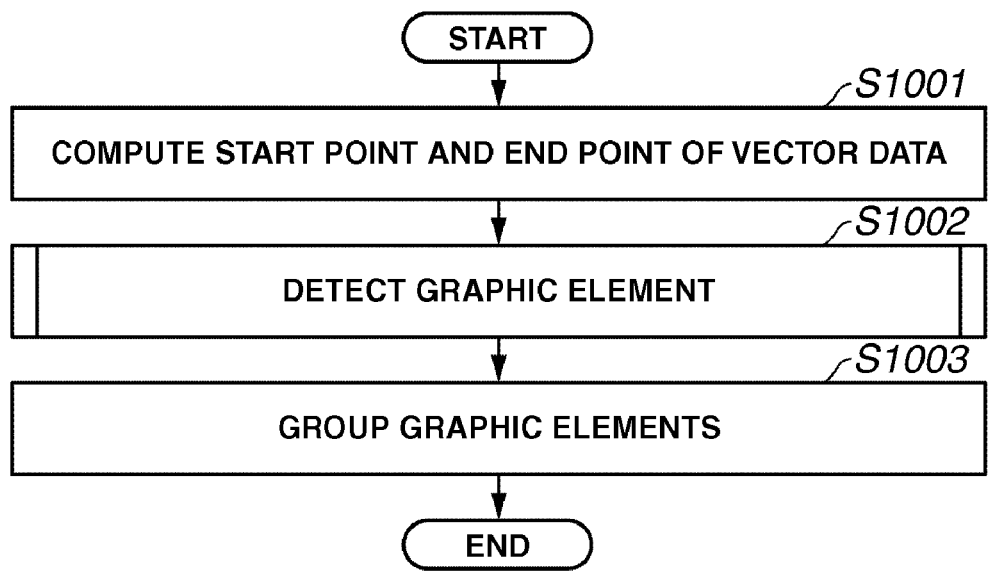
FIG. 10 is a diagram illustrating the flow of processing until vector data are grouped for each graphic object according to an exemplary embodiment of the present invention.

FIG. 10 is a flowchart illustrating the flow of processing until vector data is grouped for each content. First, the MFP 100 computes the start point and the end point of each vector data in step S1001. Next, the MFP 100 detects the object of graphics using information about start and end points of each vector data in step S1002. The detection of the object of the graphics is to detect closed graphics which are configured by piecewise lines. When the detection is executed, a principle is applied that each vector included in a closed shape has a vector which is connected to both ends of each vector. Next, the MFP 100 groups the objects of another graphic present within the object of graphics or a piecewise line into one content in step S1003. If the object of another graphic or the piecewise line is not present within the object of graphics, the MFP 100 determines the object of graphics as one content.

Figure 11:
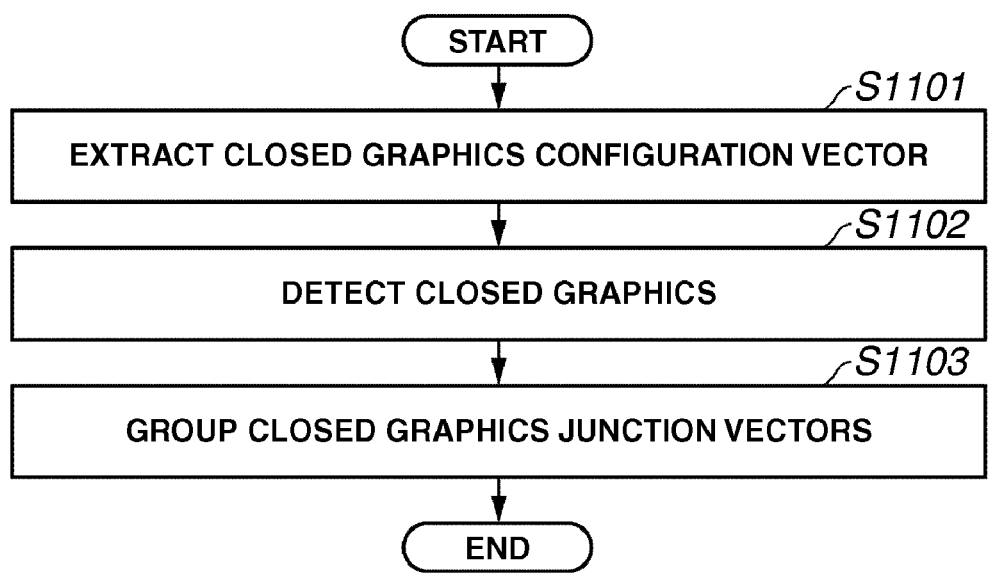
FIG. 11 is a flowchart illustrating the flow of processing for detecting a graphic element according to an exemplary embodiment of the present invention.

FIG. 11 illustrates a flowchart which detects the object of graphics. First, the MFP 100 removes an unnecessary vector which is not connected to both ends from vector data, and extracts closed graphic configuration vectors in step S1101. Next, the MFP 100 determines the start point of the vector among the closed graphic configuration vectors as a starting point, and follows the vectors clockwise in order. The processing is continued until the processing returns to the starting point. All of the passed vectors are grouped as closed graphics constituting the object of one graphic in step S1102. Further all closed graphic configuration vectors present within closed graphics are also grouped. The MFP 100 determines the start point of vectors which are not yet grouped, as a starting point and MFP similarly repeats the processing. Finally, the MFP 100 detects the vectors jointed to the vector which is grouped as the closed graphics in step S1102, from among the unnecessary vectors removed in step S1101 to group the detected vectors as one content in step S1103.

By the above described processing, the object of graphics can be treated as a individual content which can be individually searched by keyword.

Further, concerning the object in a character region, as described above, it is desirable to determine whether the object of the character region should be bound as one text by utilizing the morphologic analysis and the syntax analysis and determining whether the objects of the character region have a meaningful connection.

Search keyword generation processing illustrated in step S308 in FIG. 3A will be described in detail using FIG. 12.

First, data used in the search keyword generation processing is vector data of the content which is obtained through the content separation processing (step S303), the vectorization processing (step S306), and the content alignment processing (step S307). If the data is picture and photo contents, the data is image data. That is, the data itself is meaningful (semantic) vector data.

In the present exemplary embodiment, the MFP 100 automatically makes four types of search keywords which are illustrated in steps S1201, S1203, S1205, and S1207.

In step S1201, the MFP 100 extracts a search keyword from text data that is obtained by applying OCR to a character part in the contents within a document, and adds the extracted keyword to corresponding vector data. In step S1201, the MFP 100 processes content contained in text of a document. More specifically, the MFP 100 extracts a search keyword from the character itself if the image data includes only a character block. The MFP extracts a search keyword from a title in the neighborhood or text data in a graphic block if the image data includes the graphic block such as a line and a table.

In step S1202, the MFP 100 sets acceptance or rejection of modification to the search keyword added in step S1201. In this case, the MFP 100 sets acceptance of modification to the keyword.

In step S1203, the MFP 100 extracts a search keyword from text data obtained by applying OCR to a character part contained in the front cover of a document and adds the extracted search keyword to all vector data corresponding to the content of the document. More specifically, the MFP 100 extracts creation information such as a document name, a writer, and a creation date from the front cover of a document as a search keyword and add the extracted information to the content data of the document. By extracting such a search keyword, the MFP 100 can search for the vector data based on creation information such as a document name, a writer, and a creation date.

In step S1204, the MFP 100 sets acceptance or rejection of modification to the search keyword extracted in step S1203. In this case, the MFP 100 sets acceptance of modification to the keyword.

In step S1205, the MFP 100 adds attribute data embedded using a two-dimensional barcode, a watermark, or the like to all vector data corresponding to the content contained within a document as a search keyword. Note that the attribute data are added separately from other keywords. The attribute data includes not only the QR code as described above, but also includes electronic watermark information, paper fingerprint information, and copy-forgery-inhibited pattern information. In view of the case where copy rejection and a distribution restriction are controlled page-by-page, the MFP may add the attribute data only to the data in the same page which includes the two-dimensional barcode (electronic watermark, paper fingerprint, copy-forgery-inhibited pattern and so on). Further, the MFP 100 can be changed so as to add the attribute data to the content of all pages if a front cover includes a two-dimensional barcode (electronic watermark, paper fingerprint, copy-forgery-inhibited pattern and so on), and add only to the content data within each page if a page including a two-dimensional barcode (electronic watermark, paper fingerprint, copy-forgery-inhibited pattern and so on) is not a front cover.

In step S1206, the MFP 100 sets acceptance or rejection of modification to the search keyword extracted in step S1205. In this case, the MFP 100 sets rejection of modification to the keyword. This is the processing to prevent changing of attribute data as to processing restriction such as rejection of copying or distribution restriction. The MFP 100 may also set acceptance of modification if it is determined that the attribute data is not data subject to the processing restriction.

In step S1207, the MFP 100 copies a search keyword (attribute data) contained only in another content in the same page to add the copied keyword to vector data corresponding to its own content, as a search keyword. In the present embodiment, the MFP 100 copies a search keyword (attribute data) to vector data corresponding to all contents in the same page.

In step S1208, the MFP 100 sets acceptance or rejection of modification to the search keyword extracted in step S1207. In the present case, the MFP 100 set acceptance of modification to the extracted keyword.

The setting of acceptance or rejection of modification in the above-described steps S1202, S1204, S1206, and S1208 is processing for setting "edit right" of a search keyword. By executing such processing, the MFP 100 can not only automatically add a suitable search keyword to vector data separated in each content but also add the edit right to its search keyword.

Thus, the MFP 100 is configured such that the edit right can be set corresponding to the extraction source of a search keyword.

The search keyword set to receive acceptance of modification in steps S1202, S1204, S1206, and S1208 is a search keyword that a user can properly modify when the MFP 100 executes electronic file search and output processing in FIG. 3B. On the other hand, the search keyword set to receive rejection of modification in steps S1202, S1204, S1206, and S1208 is a search keyword that a user is hindered to modify. As described above, attribute data is information about processing restriction such as rejection of copying and distribution restriction. In order to prevent falsification, the MFP 100 sets rejection of modification to these attribute data. Such data set to receive rejection of modification cannot be modified by a user other than a specially authorized user such as a system manager.

Figure 12:
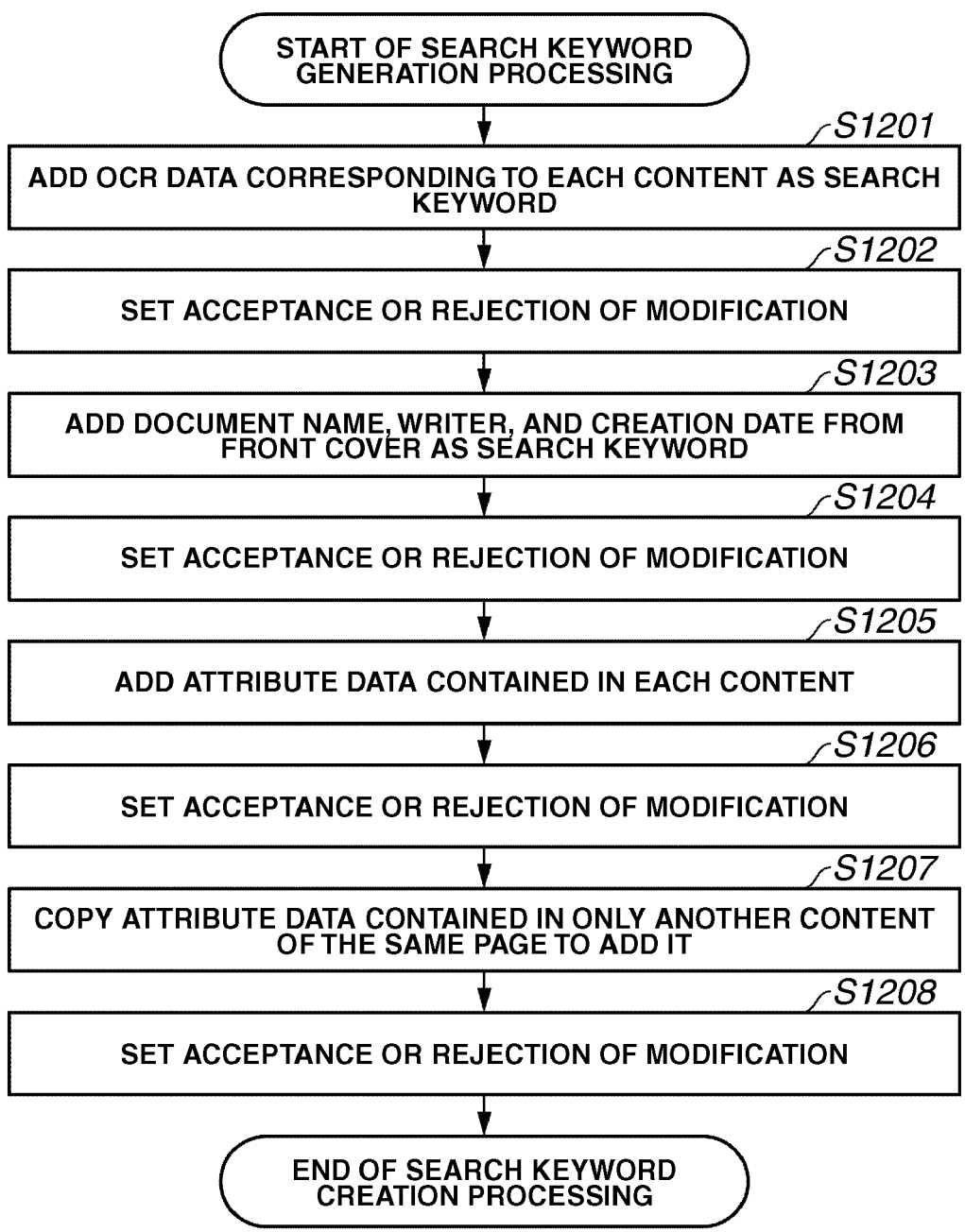
FIG. 12 is a flowchart illustrating a flow of search keyword generation processing according to an exemplary embodiment of the present invention.

In the flowchart in FIG. 12, search keywords are divided into four segments (steps S1201, S1203, S1205, and S1207), and an edit right is set for each segment in a lump. However, the present invention is not limited to this configuration. For example, it may be configured to allow setting for each search keyword.

Figure 13:
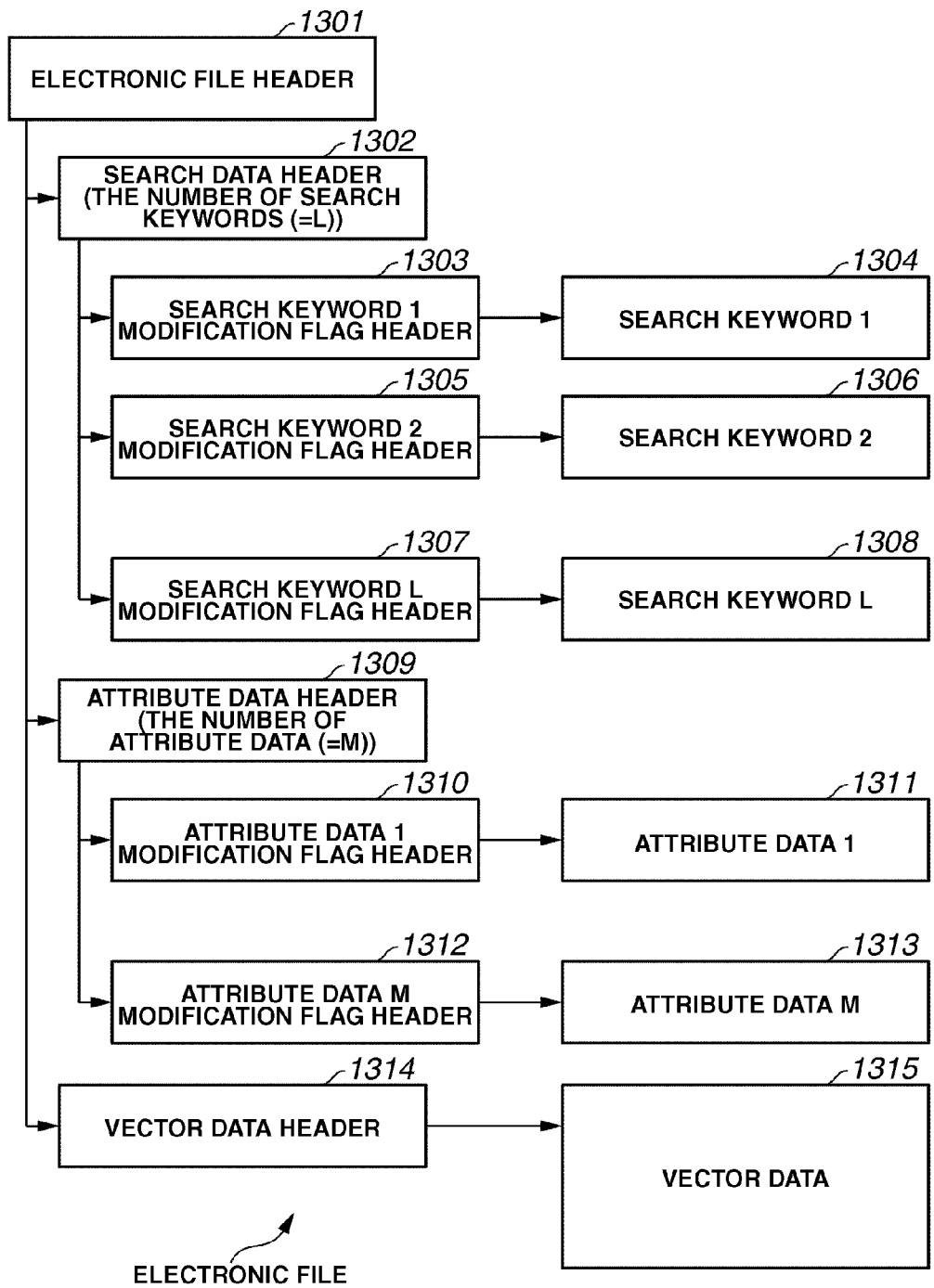
FIG. 13 is a diagram illustrating a structure of an electronic file to be stored by electronic file storage processing according to an exemplary embodiment of the present invention.

FIG. 13 is a diagram illustrating the structure of an electronic file (a file in which a search keyword and setting of acceptance or rejection of modification are added to vector data for each content) which is stored by electronic file storage processing illustrated in step S309 in FIG. 3A.

An electronic file header 1301 includes a search data header 1302 which stores the number of search keywords, an attribute header 1309 which stores the number of attribute data, and a vector data head 1314.

Each search keyword includes search keyword modification flag headers 1303, 1305, and 1307 which store a modification flag indicating the acceptance or rejection of modification of a search keyword, and search keywords 1304, 1306, and 1308.

If a modification flag in the search keyword modification flag header indicates acceptance of modification, the MFP 100 performs control to allow modification of a search keyword indicated by the header. On the contrary, if a modification flag indicates rejection of modification, the MFP 100 performs control not to allow modification of a search keyword indicated by the header.

Similarly, each of attribute data includes attribute data modification flag headers 1310 and 1312 which store a modification flag indicating acceptance or rejection of modification of attribute data, and attribute data 1311 and 1313. Similar to the search keyword, the MFP 100 controls acceptance or rejection of modification of attribute data indicated by the header, using the modification flag in attribute data modification flag headers.

Finally, vector data includes a vector data header 1314 which stores the type of vector data, and vector data 1315. If the MFP 100 controls acceptance or rejection of modification for vector data similar to the search keyword and the attribute data, the MFP 100 can control vector data by storing a modification flag in the vector data header.

Next, electronic file search and output processing will be described in detail. Since the processing other than search keyword modification processing among the electronic file search and output processing is similar to conventional processing, the search keyword modification processing will be described in detail.

Figure 14:
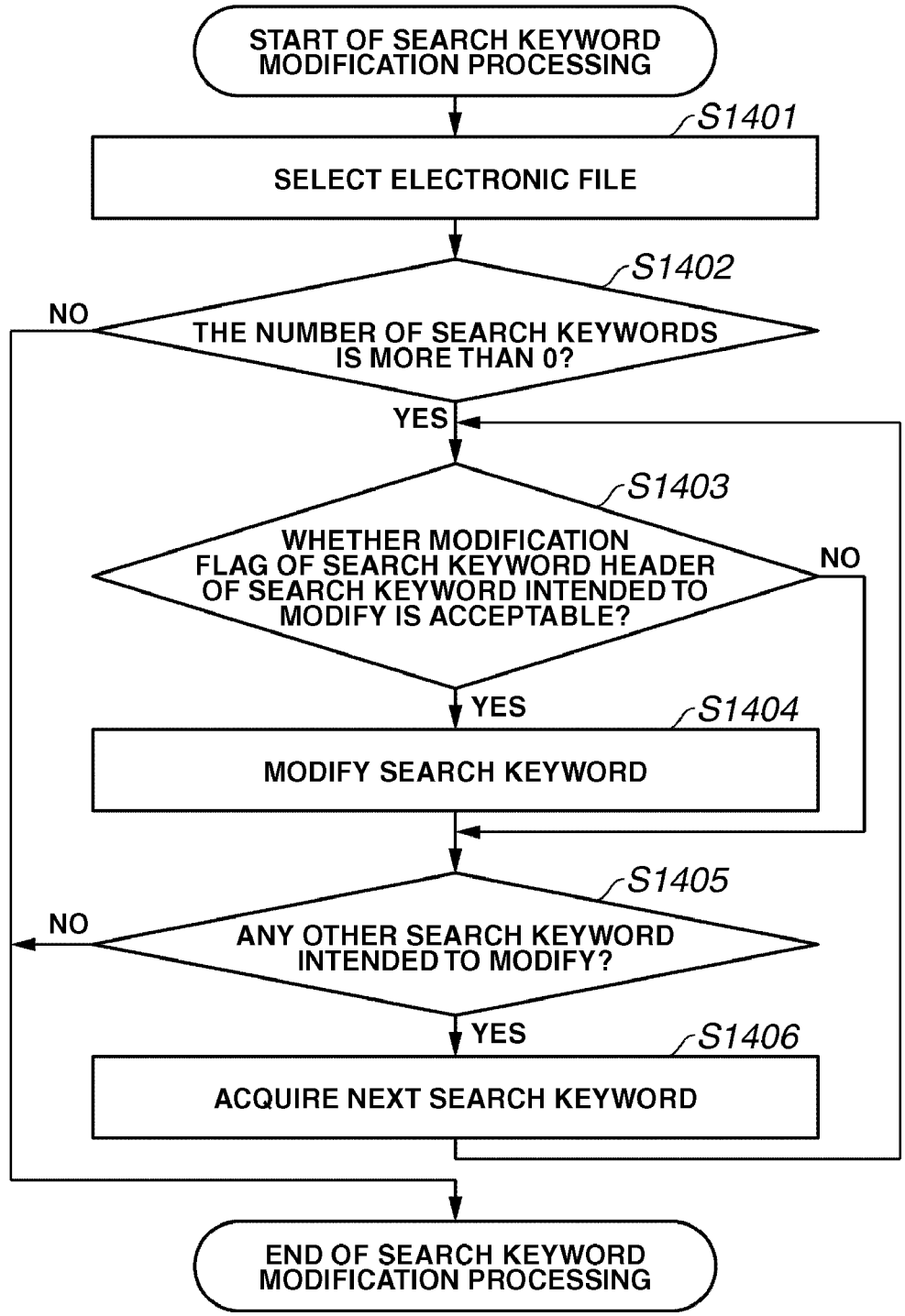
FIG. 14 is a flowchart illustrating a flow of search keyword modification processing according to an exemplary embodiment of the present invention.

FIG. 14 is a flowchart illustrating the flow of the search keyword modification processing (step S316).

In step S1401, the MFP 100 selects an electronic file for search keyword modification. In step S1402, the MFP 100 reads the search data header (1302) indicated by the electronic file header (1301) to determine whether a search keyword exists.

If the MFP 100 determines that a search keyword does not exist (NO in step S1402), the search keyword modification processing ends. On the other hand, if the MFP 100 determines that a search keyword exists (YES in step S1402), the processing proceeds to step S1403. In step S1403, the MFP 100 accesses the search keyword modification flag (1303) of a search keyword that a user intends to modify and checks acceptance or rejection of modification.

If the MFP 100 determines that modification is acceptable (YES in step S1403), the processing proceeds to step S1404. In step S1404, the MFP 100 receives modification of a search keyword. On the other hand, if the MFP 100 determines that modification is not acceptable (NO in step S1403), the processing proceeds to step S1405.

In step S1405, the MFP 100 determines whether another search keyword that a user intends to modify exists. If the MFP 100 determines that another search keyword that a user intends to modify exists (YES in step S1405), the processing proceeds to step S1406. In step S1406, the MFP 100 acquires another search keyword and the processing returns to step S1403. On the other hand, if the MFP 100 determines that another search keyword that a user intends to modify does not exist (NO in step S1405), the search keyword modification processing ends.

Next, a user interface in the MFP 100 which is operated when the above-described electronic file search and output processing is executed, will be described.

FIGS. 15A to 15C are diagrams illustrating one example of a user interface to be displayed on a display device 216 in the electronic file search and output processing in the MFP 100.

FIG. 15A is one example of a screen in the search keyword input processing (step S311). A search keyword (including attribute data) is input to an entry field 1501 in a search window 1500. By pressing a search button 1502 when a search keyword is input to the entry field 1501, the electronic file search processing is started in step S312.

FIG. 15B is one example of a screen displayed when the electronic file search processing is executed in step S312. As a result of the search processing, a applicable electronic file is displayed on a list display window 1510 as a list. A list 1511 includes a degree of matching 1512, a type 1513, and a file name 1514. Further, the content of an electronic file selected by a user (in step S1401) among electronic files displayed on the list 1511 is displayed on a thumbnail display column 1510. The electronic file displayed on the list 1511 can be selected by pressing a selection button 1515.

By pressing a modification button 1516, modification processing of an electronic file selected from among electronic files displayed on the list 1511 is started.

If "edit right" (acceptance of modification) is not set to the selected electronic file, the modification button 1516 cannot be pressed. That is, if the selection button 1515 is pressed, the MFP 100 starts determination processing whether an electronic file selected by a user has a search keyword and whether "edit right" is added in steps S1402 and S1403. If the MFP 100 determines that the electronic file has the keyword and "edit right" is added, the MFP 100 performs control to enable a user to press the modification button 1516. On the other hand if the MFP 100 determines that "edit right" is not added, the MFP 100 performs control not to enable the user to press the modification button 1516.

If the modification button 1516 is pressed, the selected electronic file can be modified in step S1404. FIG. 15C is one example of a screen which is displayed when the search keyword modification processing is executed in step S1404. A search keyword modification window 1520 displays a list of search keywords added to the selected electronic file, on a search keyword list 1521.

A user selects a desired search keyword from the search keyword list 1521. The user inputs a modified keyword to a modified keyword input column 1522. Thus, the user can modify the search keyword.

If an OK button 1523 is pressed, the modified keyword input by the user appears on the modified keyword input column 1522 and the processing ends in step S1405. On the other hand, if a cancel button 1524 is pressed, the modified keyword input by the user appears on the modified keyword input column 1522 and the processing ends (step S1405).

As described above, the MFP 100 according to the present exemplary embodiment can generate vector data for each content which constitutes a document, and store the data to allow the user to conduct a search using a search keyword.

Further, when vector data is stored, the MFP 100 according to the present exemplary embodiment can set an edit right (acceptance or rejection of modification) to each keyword.

As a result, even if a desired search result is not obtained and a search keyword is modified, the MFP 100 according to the present exemplary embodiment can perform control that does not allow unlimited modification, and enhance search accuracy and maintain information security at the same time.

Second Exemplary Embodiment

In the above-described first exemplary embodiment, the generated electronic file is stored in the storage device 211 inside the MFP 100. However, the present invention is not particularly limited to this configuration. For example, the generated electronic file can be stored in the database 105 in the office 10 via the LAN 107. Further, the generated electronic file can be stored in the database 105 in the office 20 via the Internet 104. In this case, the search processing is performed not only on the storage device 211 but also on the database 105 in the electronic file search and output processing.

Further, in the above-described exemplary embodiment, the content contained in the document read by the image reading unit 210 is vectorized. However, the present invention is not particularly limited to this configuration. For example, the contents contained in the document stored in the document management server 106 in the office 10 or the document management server 106 in the office 20 can also be vectorized.

Other Exemplary Embodiments

The present invention may be applied to a system including a plurality of devices (e.g., a host computer, an interface device, a reader, a printer), and an apparatus including a single device (e.g., a copying machine, a facsimile machine).

Further, the present invention can also be achieved when a storage medium recording the program code of software which realizes the function of the above-described exemplary embodiment, is supplied to a system or an apparatus. In this case, the above-described function will be realized by reading and executing the program code stored in the storage medium by a computer (or a CPU or a microprocessor unit (MPU)) on the system or the apparatus. In this case, the present invention includes the storage medium storing the program code.

The storage medium for supplying the program code includes, for example, a Floppy® disk, a hard disk, an optical disk, a magneto-optical disk, a compact disc read only memory (CD-ROM), a CD-recordable (CD-R), a magnetic tape, a nonvolatile memory card, and a read only memory (ROM).

Also, the present invention is not limited to a case where the function of the above-described exemplary embodiment is realized by executing the program code read by a computer. For example, the present invention also includes a case where the function of the above-described exemplary embodiment is realized by the processing in which an operating system (OS) running on a computer executes a part or the whole of actual processing based on the command of the program code.

Further, the present invention includes a case where after the program code read from the storage medium is written in a memory provided on a function expansion board inserted into a computer or a function expansion unit connected to a computer, the function of the above-described exemplary embodiment is realized. That is, the present invention also includes a case where after the program code is written in a memory, a CPU provided on a function expansion board or a function expansion unit executes a part or the whole of actual processing based on the command of the program code, and the function of the above-described exemplary embodiment is realized by the processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-336380 filed Dec. 13, 2006, which is hereby incorporated by reference herein in its entirety.

What is claimed is:

1. An apparatus comprising:
    a content acquisition unit configured to acquire content data contained in image data;
    an extraction unit configured to extract a keyword from the image data;
    a setting unit configured to set an edit right of the keyword by determining how the keyword is extracted from the image data by the extraction unit; and
    a storage unit configured to store the content data, the keyword, and the edit right of the keyword in association with each other.

2. The apparatus according to claim 1, further comprising a modification unit configured to modify the keyword associated with the content data, wherein the modification unit performs control to determine whether the modification of the keyword is acceptable or not based on the edit right of the keyword associated with the content data.

3. The apparatus according to claim 1, wherein the content acquisition unit converts the content into vector data and acquires the vector data of the acquired content as the content data.

4. The apparatus according to claim 1, wherein the setting unit sets the edit right of the keyword as rejection of modification of the keyword if the keyword was extracted from at least any one of electronic watermark information, copy-forgery-inhibited pattern information, barcode information, and paper fingerprint information which are embedded in the image data.

5. The apparatus according to claim 1, wherein the setting unit the edit right of the keyword as sets acceptance of modification of the keyword if the keyword was extracted by performing character recognition processing on a character image contained in the image data.

6. The apparatus according to claim 1, wherein the setting unit sets the edit right of the keyword as acceptance of modification of the keyword if the keyword was extracted from the front cover of the image data.

7. The apparatus according to claim 1, wherein the setting unit sets the edit right of the keyword as acceptance of modification of the keyword if the keyword is extracted from another content in the same page of the image data.

8. The apparatus according to claim 1, wherein the setting unit sets the edit right of the keyword as rejection of modification of the keyword if the keyword is data concerning processing restriction.

9. The apparatus according to claim 1, wherein the content data acquired by the content acquisition unit is data obtained by segmenting the image data as to each object and grouping the segmented objects into each content.

10. The apparatus according to claim 1, wherein the apparatus is a multifunction peripheral.

11. A method using a processor to perform the steps comprising:
   acquiring content data contained in image data;
   extracting a keyword from the image data;
   setting an edit right of the keyword by determining how the keyword is extracted from the image data in the extracting step; and
   storing the content data, the keyword, and the edit right of the keyword in association with each other.

12. A non-transitory computer-readable storage medium storing instructions which, when executed by an apparatus causes the apparatus to perform comprising the steps of:
   acquiring content data contained in image data;
   extracting a keyword from the image data;
   setting an edit right of the keyword by determining how the keyword is extracted from the image data in the extracting step; and
   storing the content data, the keyword, and the edit right of the keyword in association with each other.

* * * * *